(12) United States Patent
Gau

(10) Patent No.: US 7,023,944 B2
(45) Date of Patent: Apr. 4, 2006

(54) METHOD AND CIRCUIT FOR GLITCH-FREE CHANGING OF CLOCKS HAVING DIFFERENT PHASES

(75) Inventor: Shyh-Pyng Gau, Tainan (TW)

(73) Assignee: Via Technologies, Inc., Taipei (TW)

( * ) Notice: Subject to any disclaimer, the term of this patent is extended or adjusted under 35 U.S.C. 154(b) by 851 days.

(21) Appl. No.: 09/826,874

(22) Filed: Apr. 6, 2001

(65) Prior Publication Data

US 2001/0028693 A1    Oct. 11, 2001

(30) Foreign Application Priority Data

Apr. 7, 2000    (TW) ............... 89106478 A

(51) Int. Cl.
*H03D 3/24* (2006.01)
*H04L 7/00* (2006.01)
*H03L 7/00* (2006.01)

(52) U.S. Cl. ............... 375/373; 375/357; 327/141
(58) Field of Classification Search ............ 327/27, 327/99, 141, 144; 375/376, 375, 373, 354, 375/357
See application file for complete search history.

(56) References Cited

U.S. PATENT DOCUMENTS

| 4,119,796 | A | * | 10/1978 | Jones ................. 375/362 |
| 4,748,588 | A | * | 5/1988 | Norman et al. ........ 713/400 |
| 5,274,678 | A | | 12/1993 | Ferolito et al. |
| 5,387,825 | A | | 2/1995 | Cantrell et al. |
| 5,574,753 | A | | 11/1996 | Vartti et al. |
| 5,606,526 | A | * | 2/1997 | Pilo ................. 365/189.05 |
| 5,689,200 | A | | 11/1997 | Ting et al. |
| 6,040,725 | A | * | 3/2000 | Lee et al. .............. 327/175 |
| 6,075,392 | A | | 6/2000 | Sandner |
| 6,107,841 | A | * | 8/2000 | Goodnow .............. 327/99 |
| 6,636,575 | B1 | * | 10/2003 | Ott .................. 375/376 |

* cited by examiner

*Primary Examiner*—Stephen Chin
*Assistant Examiner*—Cicely Ware
(74) *Attorney, Agent, or Firm*—Rabin & Berdo, P.C.

(57) ABSTRACT

A circuit for glitch-free changing of clocks having different phases. The circuit comprises a phase detector for receiving a data stream and a system clock, and generating a phase-up signal and a phase-down signal; a flag signal generator for receiving the phase-up signal and the phase-down signal, and then generating M flag signals, wherein the select signal corresponding to the enabled flag signal is enabled; an output stage for receiving the M select signals and the M clocks, and then outputting the system clock.

17 Claims, 14 Drawing Sheets

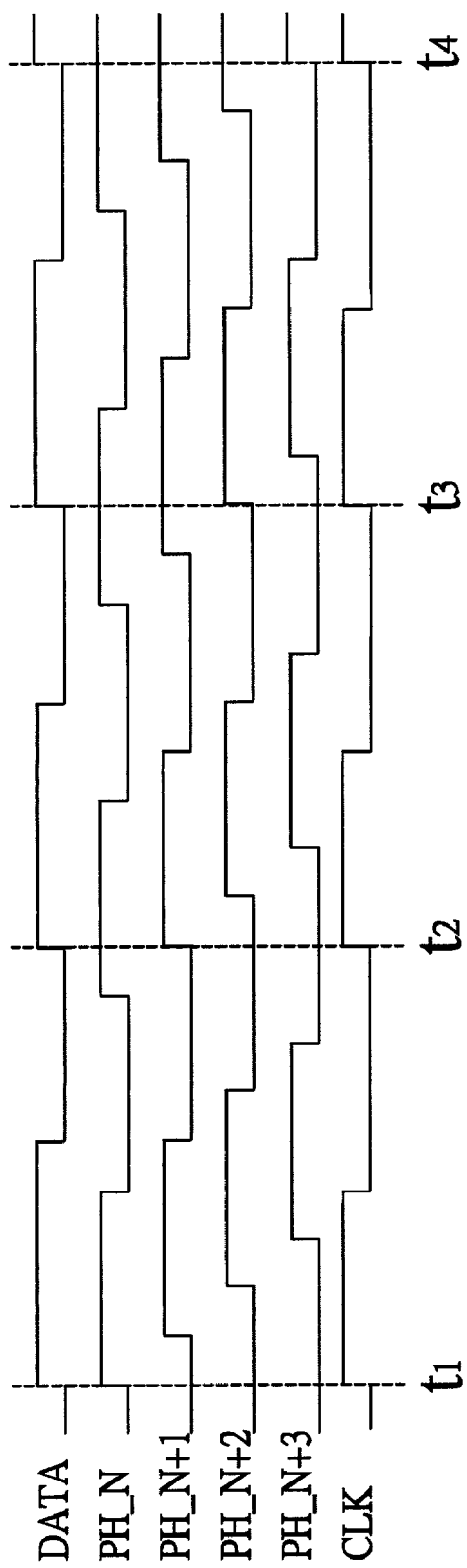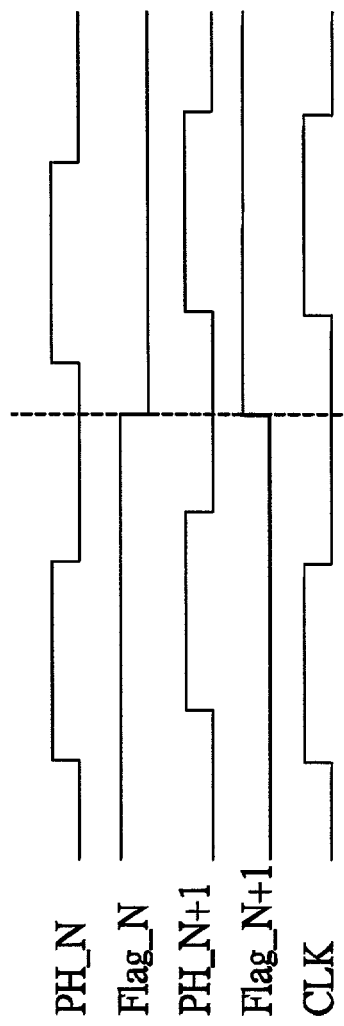
FIG. 1(Prior Art)
FIG. 2(Prior Art)

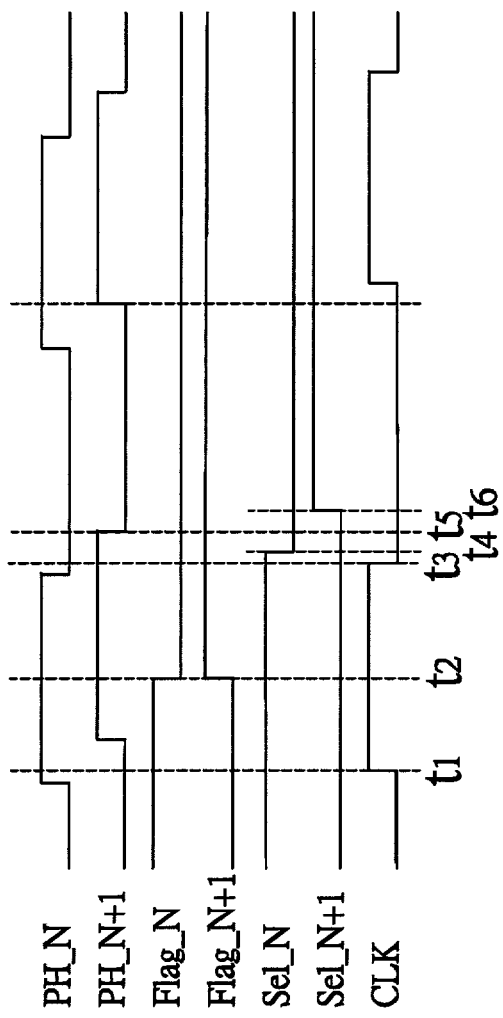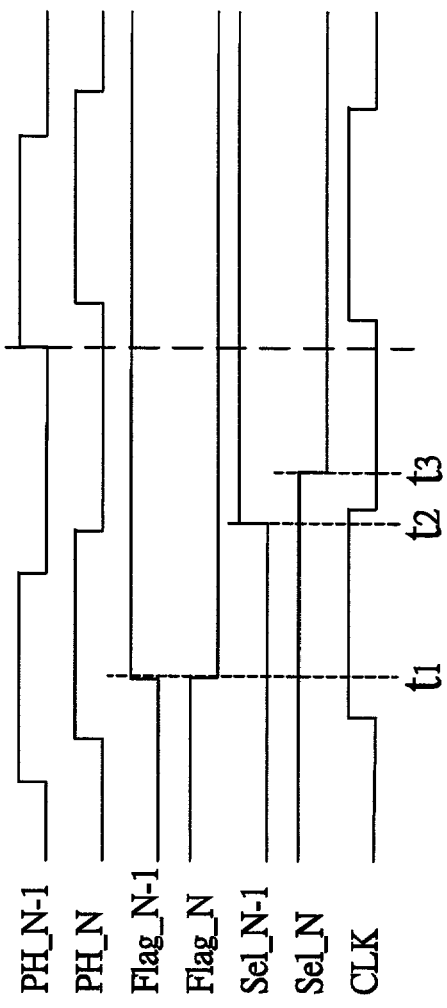

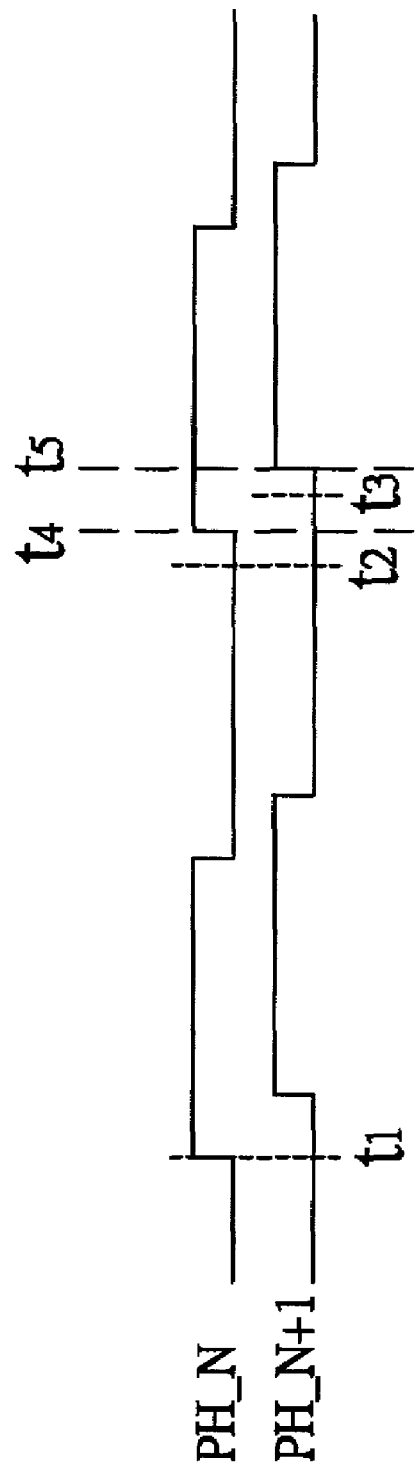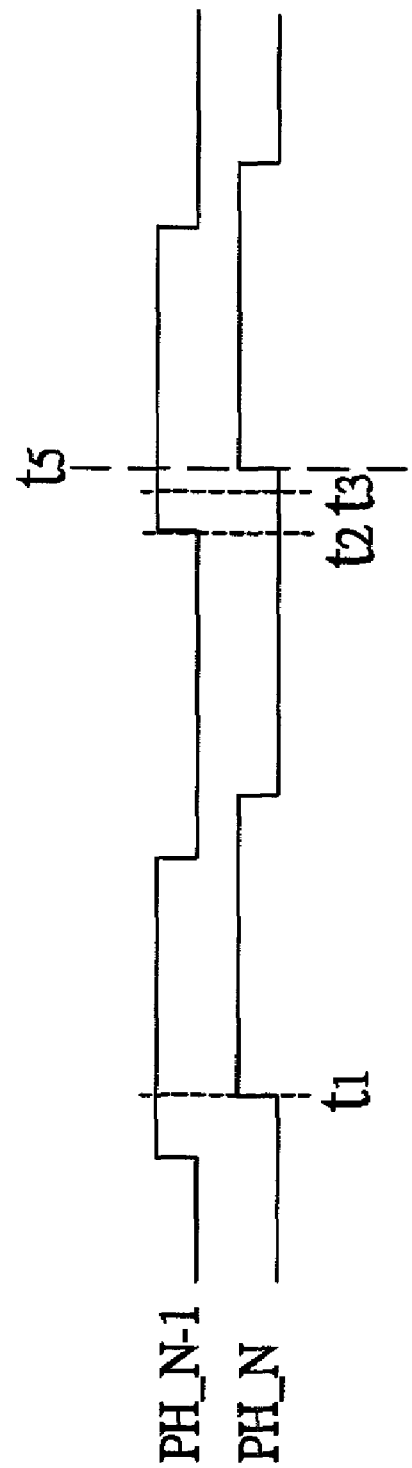

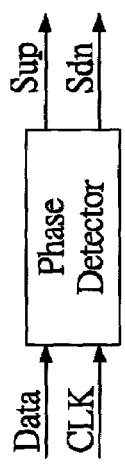
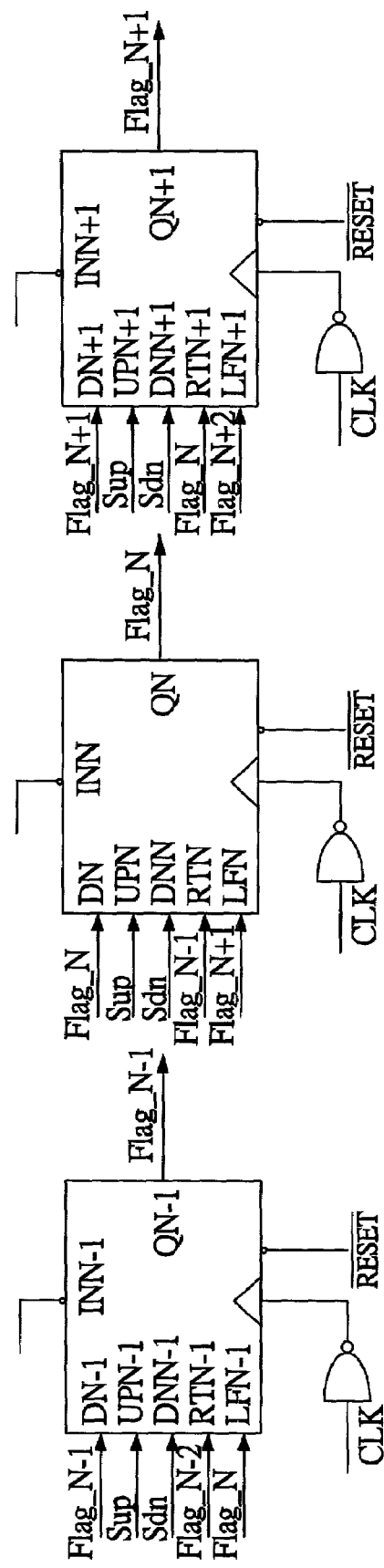
FIG. 10A
FIG. 10B

METHOD AND CIRCUIT FOR GLITCH-FREE CHANGING OF CLOCKS HAVING DIFFERENT PHASES

This application incorporates by reference Taiwanese application Ser. No. 089106478, filed 04/07/2000.

BACKGROUND OF THE INVENTION

1. Field of Invention

The present invention relates to a method and circuit for glitch-free changing of clocks having different phases. More particularly, the present invention relates to a method and circuit for glitch-free changing of clocks having different phases for a communication network system.

2. Description of Related Art

Generally, in an Ethernet communication network system, a receiver can usually only receive data streams transmitted from a transmitter while the clock of the transmitter is not transmitted to the receiver. If the receiver is prepared to sample the data streams transmitted from the transmitter, the clock of the receiver must be synchronized with the data. This is called the timing recovery.

The conventional method for executing the timing recovery uses a phase locked loop (PLL) for generating clocks with different phases at the receiver. For example, the PLL can generate 10, 20 or more clocks with different phases. By changing different clocks, the phases of the data streams are locked and tracked such that sampling clock are synchronized with the data, and therefore, the data streams can be read.

FIG. 1 shows a timing diagram for illustrating that the data are locked by one of the clocks with different phases. The clocks with different phases generated by the PLL include clocks PH_N, PH_N+1, PH_N+2, and PH_N+3 that all have the same frequency but are different in phase and sequence. Referring to FIG. 1, at time $t_1$, when the receiver receives a data stream DATA, the data stream DATA must be locked and tracked using the clock PH_N. At time $t_2$, the data stream DATA and the clock PH_N are out of phase, and therefore, the clock must be changed to PH_N+1. At time $t_3$, the data stream DATA and the clock PH_N+1 are out of phase, and therefore, PH_N+2 must be used for locking and tracking the data stream DATA. At time $t_4$, the data stream DATA and the clock PH_N+2 are out of phase, and therefore, the clock PH_N+3 must be used for locking and tracking the data stream DATA. Therefore, the receiver has to change its system clock phase in response to the phase change of the data stream DATA. For example, the clocks PH_N, PH_N+1, PH_N+2 and PH_N+3 are respectively used as the system clock CLK of the receiver at each time $t_1$, $t_2$, $t_3$ and $t_4$ for locking and tracking the data stream DATA.

FIG. 2 shows a timing diagram for changing the system clock. The operation of the conventional method is described using the process in which the system clock CLK is changed from the clock PH_N to PH_N+1 as an example. According to the conventional method, the clock PH_N or PH_N+1 is selected by determining whether the flag signal Flag_N or Flag_N+1 is enabled, e.g. at a high-level state). When the receiver detects that the phase of the data stream DATA has changed, the flag signal is changed correspondingly. For example, at time t, the flag signal Flag_N is changed from high to low while Flag_N+1 is changed from low to high. Therefore, the clock PH_N is used as the system clock CLK before time t, and the clock PH_N+1 is used as the system clock CLK after time t.

FIG. 3 shows a timing diagram for changing the system clock with glitch. Referring to FIG. 3, when the flag signals Flag_N and Flag_N+1 are changed at time $t_2$ simultaneously, the clock PH_N is used as the system clock CLK before time $t_2$, and the clock PH_N+1 is used as the system clock CLK after time $t_2$. During the changing of the clocks, at time $t_2$, the clock PH_N is high while the clock PH_N+1 is low. The system clock CLK is changing from low to high at time ti while changing from high to low at time $t_2$, so an undesired glitch between the time interval $t_1$ and $t_2$ is produced. This glitch will interfere with data sampling.

FIG. 4 shows another timing diagram for changing the system clock with glitch. The glitch can occur when a circuit for example, is interfered by noise. The nonlinear signals result in that the two flag signals Flag_N and Flag_N+1 are not changing at the same time. In addition, the glitch can occur due to instability of the clocks. As shown in FIG. 4, the flag Flag_N is changing from high to low at time $t_2$ but the flag Flag_N+1 is changing from low to high at a delayed time $t_3$. The flag Flag_N and Flag_N+1 are not changing at the same time, resulting in a glitch occurring between time $t_1$ and $t_2$.

The glitch causes an unexpected pulse in the system clock CLK. If the pulse width of the glitch is too large, the glitch may be mistaken as the system clock CLK. The data stream DATA is then sampled according to the glitches, and thus a wrong sampling result is obtained. In addition, if the system clock includes glitches, the data stream cannot be correctly phase-locked and tracked, so as to fail reading data.

The conventional method for eliminating the glitch uses a low pass filter (LPF) consisting of capacitors for filtering the glitches in the system clock. However, if the period of the glitches is too long, larger capacitors are needed to filter the glitches, which increases the device area and cost. In addition, due to the capacitance effect, the rising and falling time of the system clock are increased, which limits the frequency of the system clock.

SUMMARY OF THE INVENTION

It is therefore one objective of the present invention to provide a method and circuit for a glitch-free changing of clocks having different phases by the use of logic circuits to eliminate the glitch during the transition of the clocks. Since no capacitors are used in the circuits, the frequency of the clocks is not restricted. The method and circuit are suitable for a high frequency system and are not affected by the nonlinear effects of circuits. In addition, because logic circuits are used, a larger tolerance of different manufacturing process, temperature, and power source etc. is possible.

As embodied and broadly described herein, the invention provides a circuit for a glitch-free changing of clocks having different phase. The circuit receives M clocks labeled by 1~M and at least one data stream, whereby one of the M clocks (labeled by N, $1 \leq N \leq M$) is selected to be a system clock. The M clocks have the same frequency but are different in phase sequentially. The circuit includes a phase detector, flag signal generator, select signal generator, and an output stage. The phase detector is used for receiving the data and the system clock and then generates a phase-up and phase-down signal. The flag signal generator is coupled to the phase detector for receiving the phase-up and phase-down signal, and then generates M flag signals, wherein only one of the M flag signal is enabled at the same time. The select signal generator having M low pass filters is coupled to the flag signal generator for receiving the M flag and M clocks and then generates corresponding M select signals.

The output stage is coupled to the select signal generator for receiving the M select and M clocks, and then outputs the system clock, wherein the outputted system clock corresponds to one of the M clocks selected by the enabled select signal.

According to another objective of the present invention, it provides a method for a glitch-free changing of clocks having different phases, used for receiving M clock and at least one data stream and then outputting a system clock. The M clocks have the same frequency but are different in phase sequentially, and one of the M clocks (labeled by clock signal N, $1 \leq N \leq M$) is currently the system clock. When the phase of the data signal lags behind the phase of the system clock and the system clock is a first level, the flag signal N+1 is enabled. When the clock N is the first level the select signal N+1 is enabled and the system clock is changed to the clock N+1. Similarly, when the phase of the data signal leads the phase of the system clock and the system clock is a first level, the flag signal N−1 is enabled. When the clock N is the first level the select signal N−1 is enabled and the system clock is changed to the clock N−1.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 shows a timing diagram for illustrating that the data streams are locked by changing clocks with different phases;

FIG. 2 shows a timing diagram for changing the system clock, according to the conventional method;

FIGS. 8A to 8C are timing diagram of changing the system clock shown in FIGS. 7A to 7D;

FIGS. 9A and 9B show safety range for normal operating the phase change circuit to change the system clock of FIGS. 7A to 7F;

FIGS. 10A to 10D show another logic circuit for changing the phase of the system clock;

DESCRIPTION OF THE PREFERRED EMBODIMENTS

Figure 3:
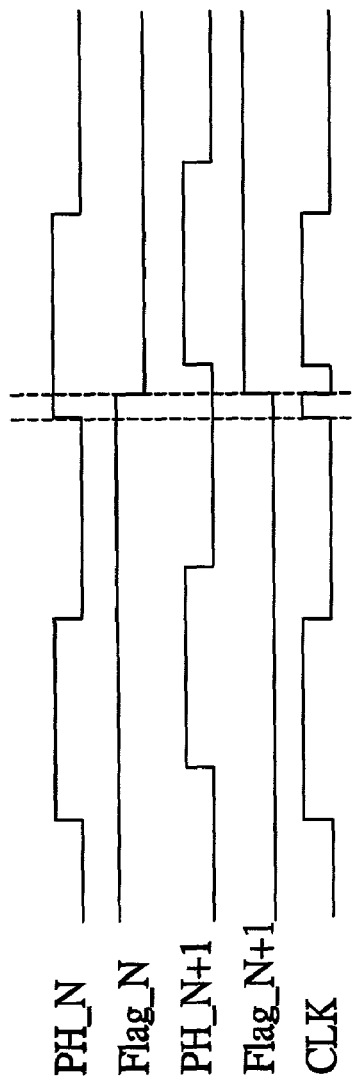
FIG. 3 shows a timing diagram for changing the system clock with glitch, according to the conventional method.
Figure 4:
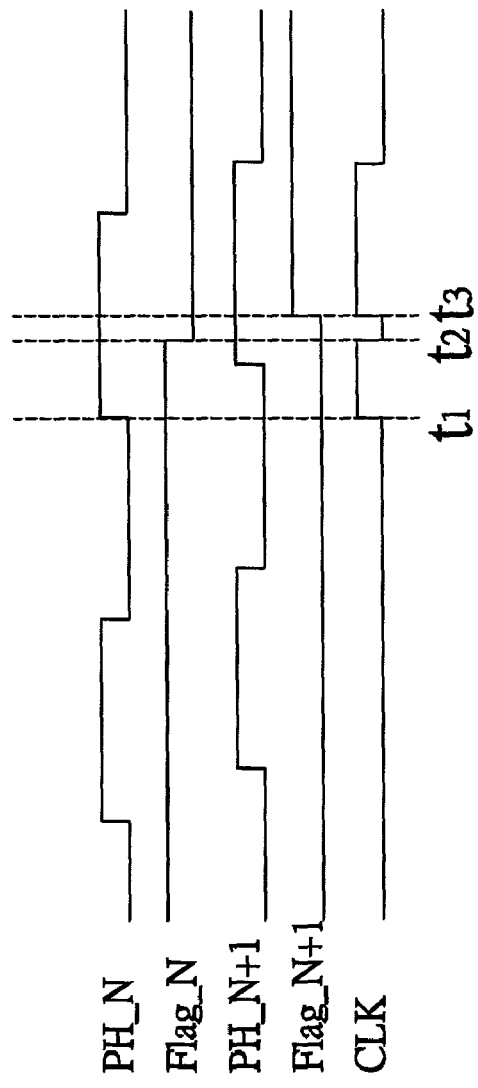
FIG. 4 shows another timing diagram for changing the system clock with glitch.
Figure 5:
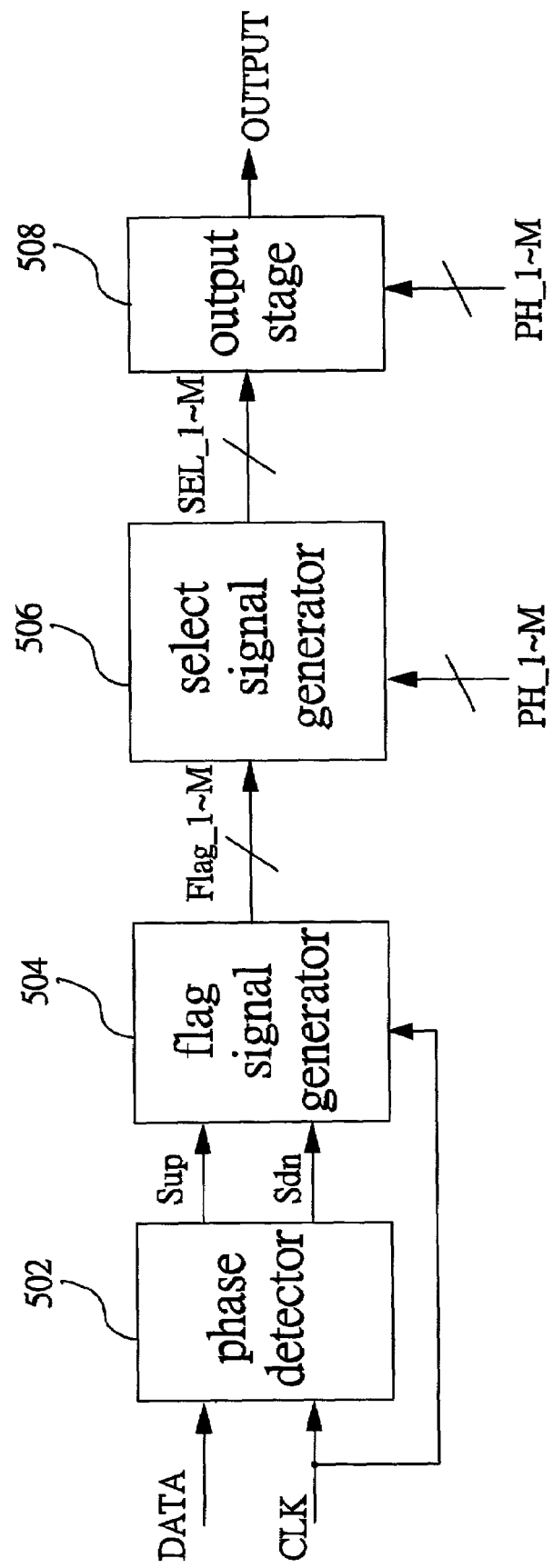
FIG. 5 schematically shows a block diagram for a glitch-free changing of clocks having different phases according to an embodiment of the present invention.

FIG. 5 schematically shows a block diagram for glitch-free changing of clocks having different phases according to an embodiment of the present invention. Referring to FIG. 5, a phase locked loop (PLL, not shown) generates a plurality of clocks, such as M clocks PH_1, PH_2, . . . , PH_M, wherein the M clocks PH_1, PH_2, . . . , PH_M have the same frequency but are different in phase. In addition, the phase of each clock varies sequentially. One of the M clocks PH_1, PH_2, . . . , PH_M, such as the clock PH_N ($1 \leq N \leq M$), is used as a system clock CLK. The system clock CLK is used for locking and tracking a data stream DATA, to synchronize the system clock CLK and the data stream DATA, so as to access the data stream. If the phase of the data stream DATA is changed, the system clock CLK then has to correspondingly change its phase, to synchronize the system clock CLK and the data stream DATA , so as to access the data stream.

Referring to FIG. 5, a phase detector 502, flag signal generator 504, select signal generator 506, and an output stage 508 are used for achieving the function for glitch-free changing of clocks having different phases. The phase detector 502 is used for detecting and indicating the phase change of the data stream DATA. The phase detector 502 receives the data stream DATA and the system clock CLK and then outputs a phase-up signal Sup and a phase-down signal Sdn to the flag signal generator 504. The flag signal generator 504 is capable of outputting M flag signals Flag1, Flag2, Flag3, . . . , FlagM, which are used for the inputs of the select signal generator 506. For example, when the phase-up signal Sup is enabled, the flag signal Flag_N+1 is enabled; when the phase-down signal Sdn is enabled, the flag signal Flag_N−1 is enabled. Only one flag signal is enabled at the same time. In the embodiment, for example, a first and a second level is referred to a low level and a high level respectively, and the high level is referred to be enabled The select signal generator 506 is used for receiving the flag signals Flag 1, Flag 2, . . . , Flag M, and then generating corresponding M select signals Sel_1, Sel_2, . . . , Sel_M. When one of the M clocks PH_1, PH_2, . . . , PH_M is in a low-level state, such as the clock PH_N, the corresponding flag signal Flag_N is enabled. The select signal Sel_N, which corresponds to the enabled Flag signal Flag_N, is enabled and the other select signals are disabled.

The select signal generator 506 further comprises M select logic units (not shown), designated as select logic units 1~M. Each of the M select logic units comprises an input, a clock input, and an output. The M flag signals Flag 1, Flag 2, . . . , Flag M are respectively inputted to the input of each of the M select logic units. The M select logic units output M select signals Sel_1, Sel_2, Sel_3, . . . , and Sel_M. The select signals Sel_1, Sel_2, Sel_3, . . . , and Sel_M are then inputted to the output stage 508. For example, the select logic unit N ($1 \leq N \leq M$) receives the flag signal Flag_N through the input terminal, and the clock PH_N through the clock input terminal. When the clock PH_N is a low level and when the flag signal Flag_N is enabled, the select signal Sel_N is enabled. When the clock PH_N is a low level and when the flag signal Flag_N is disabled, the select signal Sel_N is disabled.

The output stage 508 receives M clocks PH_1, PH_2, . . . , PH_M and M select signals Sel_1, Sel_2, . . . , Sel_N, and then outputs an output signal OUTPUT as the system clock CLK. If the select signal Sel_N is enabled, the clock PH_N is then selected by the select signal Sel_N. The output stage 508 uses the clock PH_N as the OUTPUT signal to be the system clock CLK.

Figure 6:
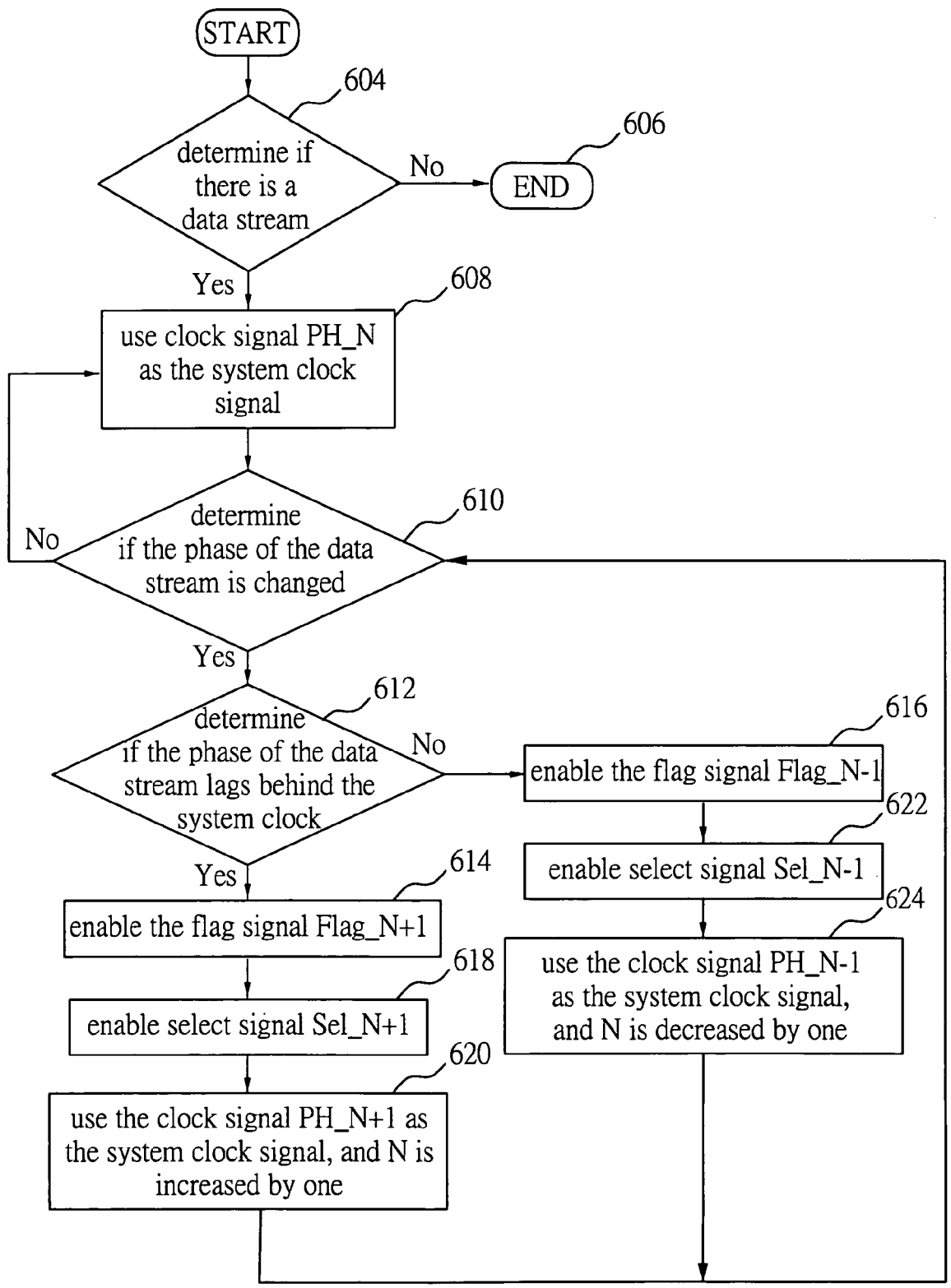
FIG. 6 schematically shows a flow chart for illustrating the method for glitch-free changing of clocks having different phases according to an embodiment of the present invention.

FIG. 6 schematically shows a flow chart for illustrating the method for a glitch-free changing of clocks having different phases according to the embodiment of the present invention.

As shown in FIG. 6, step 604 is performed to determine if a data stream DATA is received. If no data stream DATA is received, the method proceeds to step 606 to terminate the process. If a data stream DATA is received, step 608 is performed. At step 608, a clock PH_N ($1 \leq N \leq M$) is selected to be the system clock CLK. Next, step 610 is performed to determine if the phase of the data stream DATA is changed. When the phase of the data stream DATA is changed, step 612 is performed; otherwise step 608 is repeated.

In step 612, it is determined whether or not the phase of data stream DATA lags behind the phase of the system clock CLK. If the phase of data stream DATA lags behinds the phase of the system clock CLK, it is changed to the clock PH_N+1 (which lags behind clock PH_N), and then step 614 is entered. Otherwise, the PH_N the system clock CLK is changed to the clock PH_N−1 whose phase leads the original clock PH_N, and then step 616 is entered.

At step 614, the flag signal Flag_N+1 is enabled while the flag signal Flag_N is disabled. It is noted that only one flag signal among Flag 1~M is enabled at any time. In step 618, when the clock PH_N+1 is at the low level, the select signal Sel_N+1 is enabled ; and while when the clock PH_N is at the low level, the select signal Sel_N is disabled. In step 620, the system clock CLK is changed to the clock PH_N+1 and N is increased by one. During this step, if one of the select signals Sel_1~M is enabled, the system clock CLK is then changed to a clock corresponding to the enabled select signal.

Similarly, at step 616, the flag signal Flag_N−1 is enabled and the flag signal Flag_N is disabled. Next, proceed to step 622. When the clock PH_N−1 is at the low level, the select signal Sel_N−1 is enabled, and when the clock PH_N is at the low level, the select signal Sel_N is disabled. Proceeding to step 624, the system clock CLK is then changed to the clock PH_N−1 and N is decreased by one.

Figure 7A:
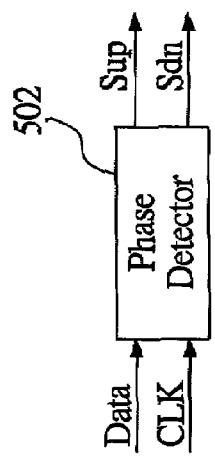
FIGS. 7A–7F schematically shows exemplary circuits for illustrating the circuit for glitch-free changing of clocks having different phases according to the embodiment of the present invention.

FIGS. 7A–7F schematically show exemplary circuits for illustrating the circuit for glitch-free changing of clocks having different phases according to an embodiment of the present invention. FIG. 7A shows an exemplary circuit for the phase detector 502 shown in FIG. 5. The phase detector 502 receives the data stream DATA and the system clock CLK and then generates the phase-up signal Sup and the phase down signal Sdn.

Figure 7B:
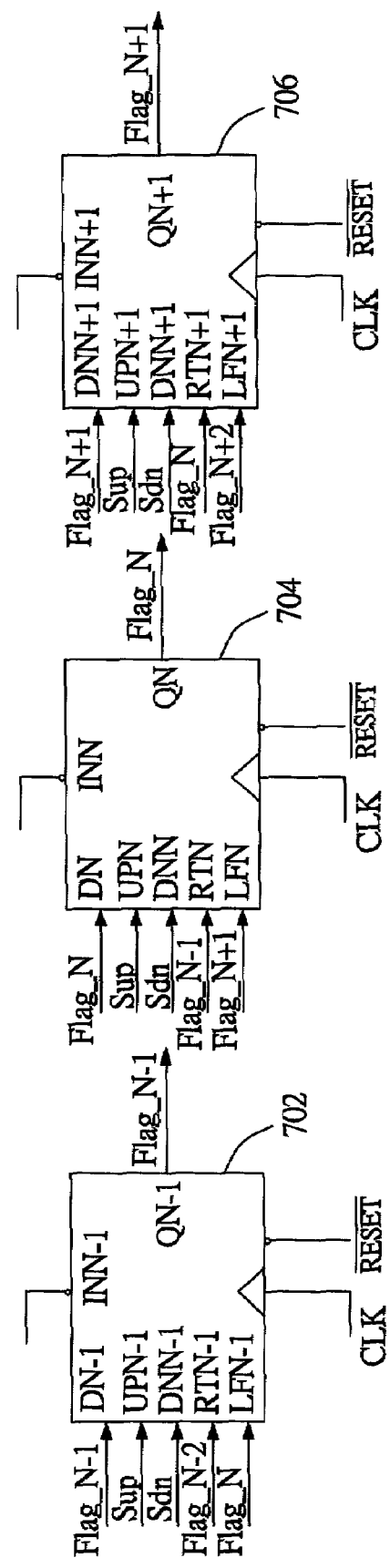

FIG. 7B is a block diagram of the flag signal generator. The flag signal generator 504 comprises ring counters including M counting logic units, for example, a first counting logic unit 702, second counting logic unit 704, and third counting logic unit 706. Each of the counting logic units respectively uses the system clock CLK as the input signal of its clock input, the phase up signal Sup as the input signal of its up signal input UP, the phase down signal Sdn as the input signal of its down signal input D, and the corresponding flag signal as the output signal of its output Q. In addition, each of the counting units uses the previous and next flag signals as the input signals of its right (RT) and left (LT) inputs respectively. Each counting logic unit further includes an input IN for receiving an additional signal and a reset signal RESET. The output end of each counting logic unit is used for outputting the corresponding flag signal and the counting logic unit is triggered at the rising edge. As shown in FIG. 7B, the clock PH_N serves as the system clock CLK, and therefore, the flag signal Flag_N is enabled. Thereafter, when the phase up signal Sup is enabled, the flag signal Flag_N+1 is enabled and the flag signal Flag_N is disabled; and when the phase down signal Sdn is enabled, the flag signal Flag_N−1 is enabled and the flag signal Flag_N is disabled.

Figure 7C:
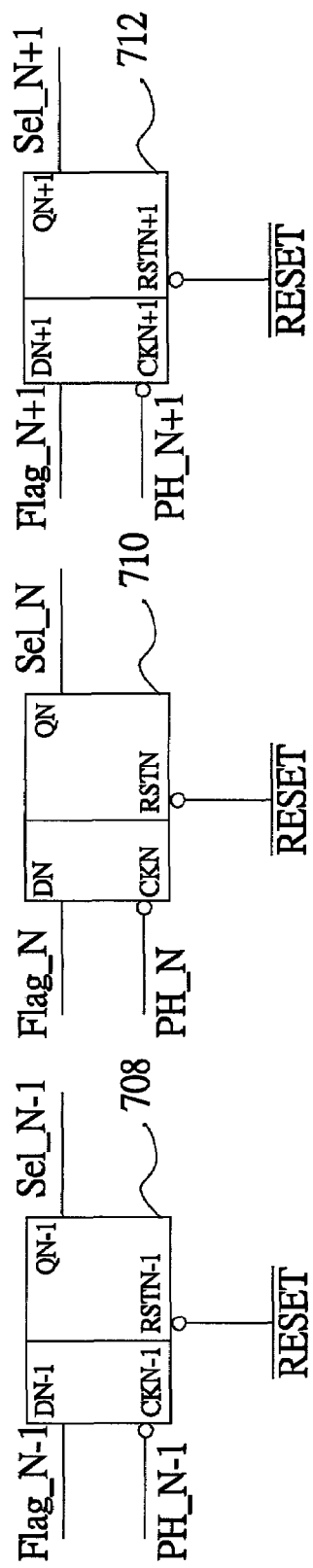

FIG. 7C is a block diagram of the select signal generator. The select signal generator 506 comprises M select logic units, labeled 1~M. In the embodiment, the select signal generator 506 uses M low pass latches as the select logic units. For example, a first low pass latch 708, second low pass latch 710, and third low pass latch 712. Each of the low pass latches uses one of the corresponding flag signal Flag 1~M and one of the corresponding clock PH_1~M, and outputs one of the corresponding select signal Sel_1~M. For example, for the low pass latch N, flag signal Flag_N is inputted to the input DN and the clock PH_N is inputted to clock end CKN, and the select signal Sel_N is outputted from QN. The reset signal is used to reset the low pass latch N. When the clock is at the low level, the corresponding flag signal is outputted as the select signal.

Figure 7D:
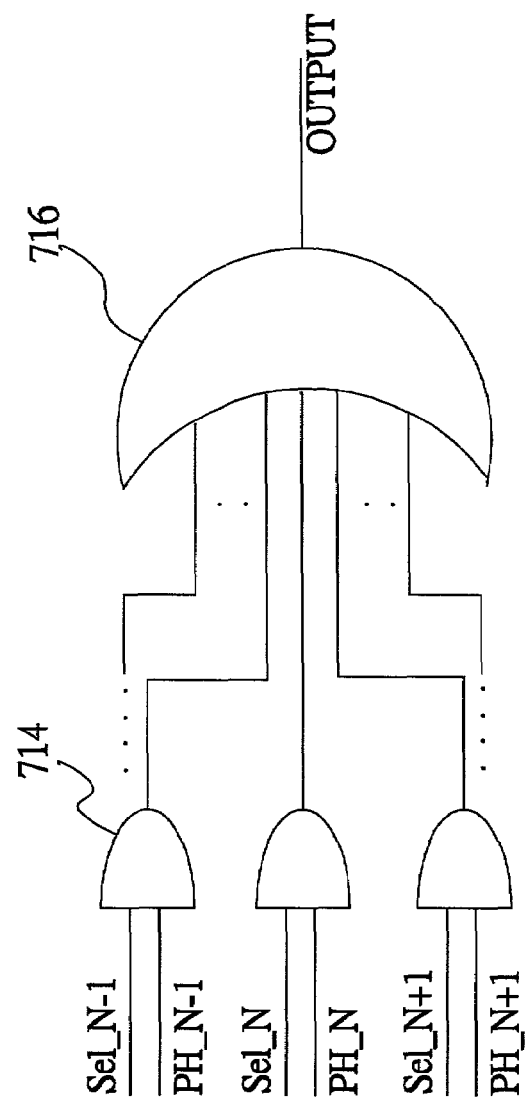

FIG. 7D is a circuit diagram of the output stage. The output stage 508 comprises M AND gates 714 and an OR gate 716 having M inputs. Each of the AND gates 714 performs an AND operation of the corresponding select signal and the corresponding clock. All of the output signals of the AND gates 714 are inputted to the OR gate 716, and an output signal OUTPUT used is generated as the system clock CLK. In other words, the enabled select signal selects a corresponding clocks from PH_1~M as the system clock CLK. However, during the changing of the select signal, if two select signals are enabled simultaneously, the output signal OUTPUT will be the result of the OR operation of the two enabled select signals.

Figure 7E:
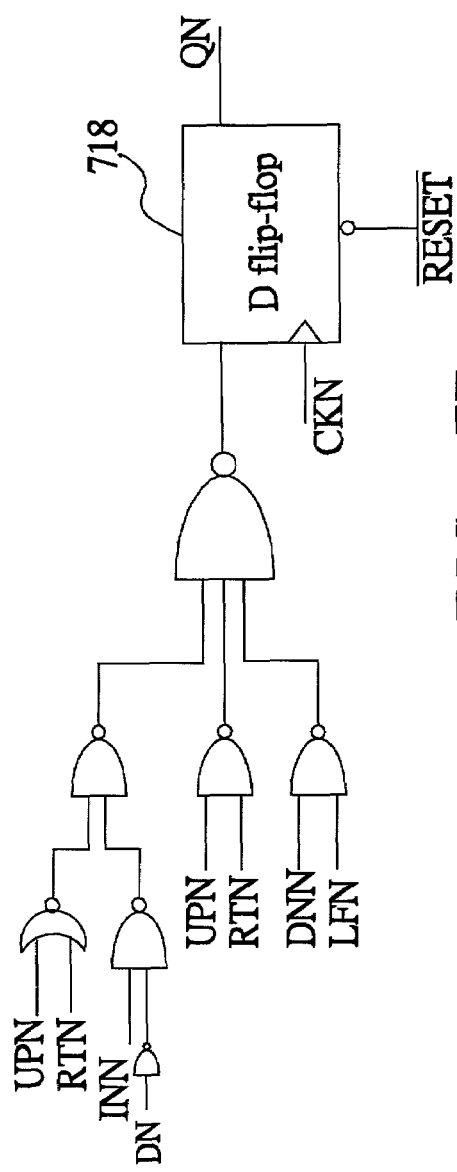
Figure 7F:
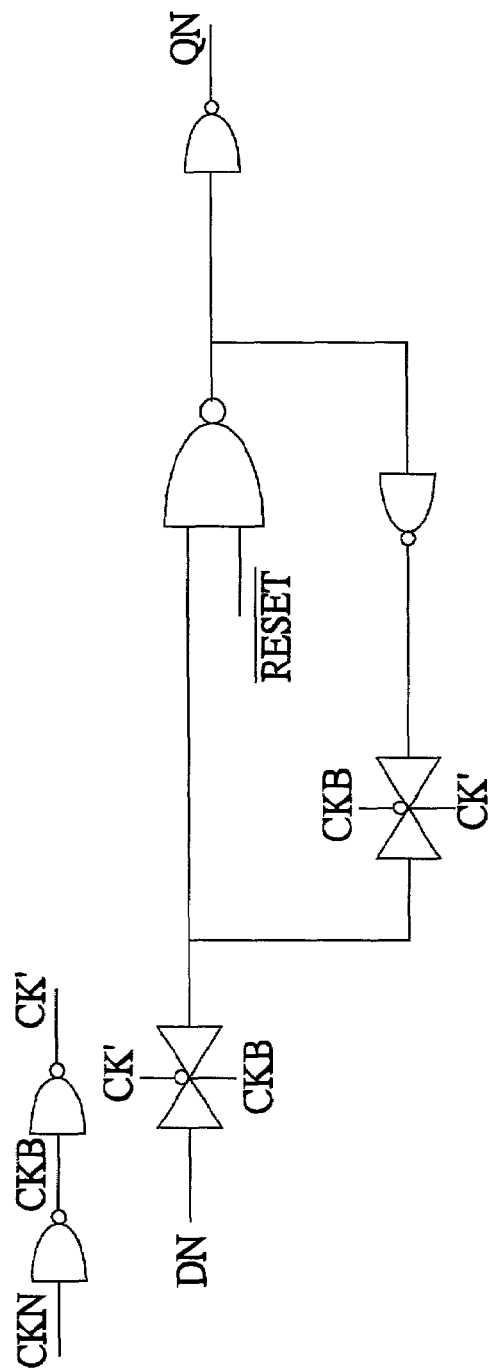

FIG. 7E is a circuit diagram of the counting logic unit shown in FIG. 7B. The counting logic unit further comprises a D-type flip-flop 718. And, FIG. 7F is an exemplary detailed circuit diagram of the low pass latch shown in FIG. 7C.

Figure 8C:
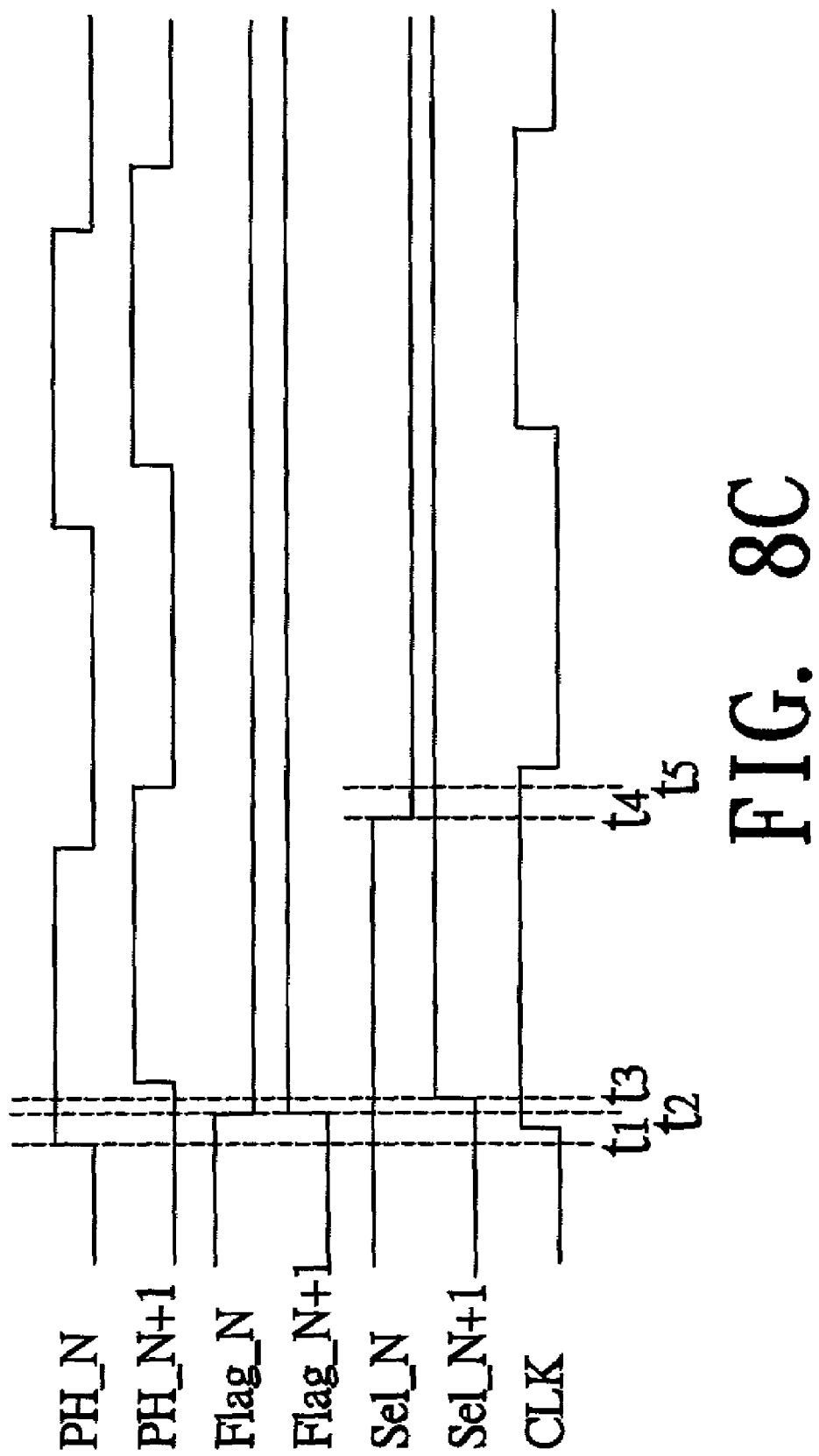
Figure 10C:
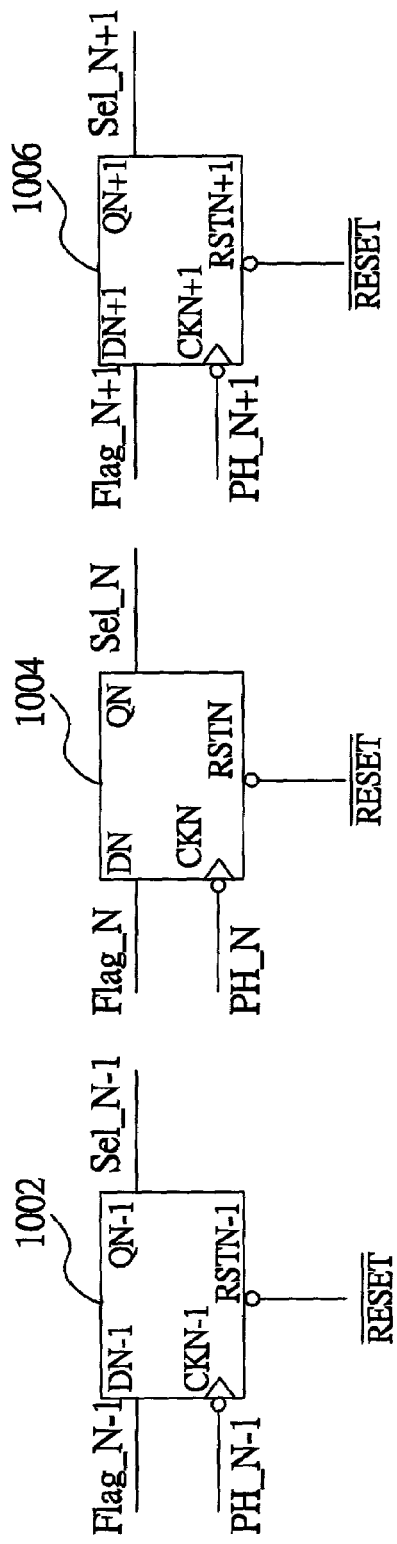
Figure 10D:
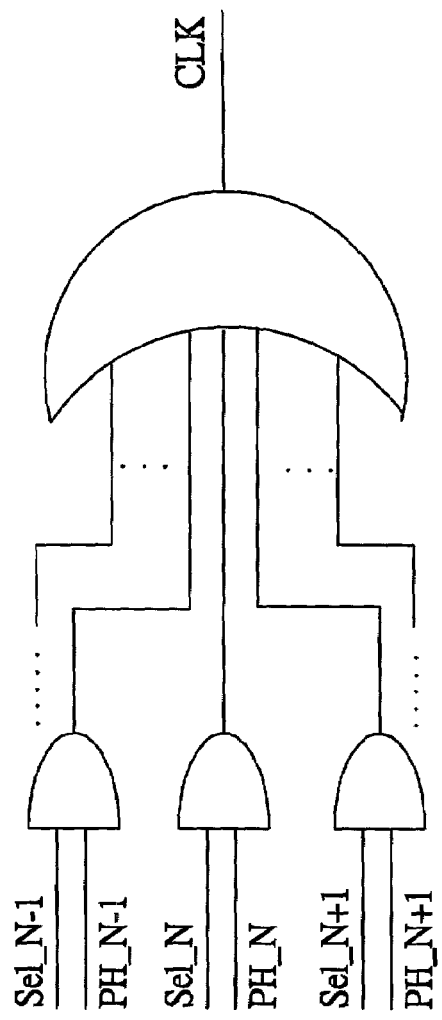

FIGS. 8A to 8C are timing diagrams of changing the system clock shown in FIGS. 7A to 7D. Referring to FIGS. 7A–7D and 8A–8C, FIG. 8A is a timing diagram showing the phase of the data signal lagging behind the phase of the system clock. Assume the current system clock CLK is the clock PH_N. When the phase of the data signal DATA lags behind the phase of the system clock CLK, the system clock CLK must be changed to clock PH_N+1 whereby the data signal DATA can be locked and accessed.

When the phase of the data signal DATA detected by the phase detector 502 as lagging behind the phase of the system clock CLK, the phase up signal Sup is enabled. At the rising edge while the system clock CLK is changing from a low level to a high level; for example at time $t_1$, the flag signal Flag N is disabled and the flag signal Flag_N+1 is enabled. However, actually the flag signals Flag_N and Flag_N+1 complete their changing state at time $t_2$ because of signal delay in circuit.

When the clock PH_N is at a low level, such as at time $t_3$, the select signal Sel_N is disabled, but actually may be disabled till time $t_4$ due to signal delay. When the clock PH_N+1 is at a low level, such as at time $t_5$, the select signal Sel_N+1 is enabled. Similarly, due to signal delay, the select signal Sel_N+1 will be enabled till time $t_6$. By the operation of the AND gates 714 and the OR gate 716 of the output stage 508, the clock PH_N+1 corresponding to the select signal Sel_N+1 is selected as the system clock CLK. Therefore, the clock PH_N is the system clock CLK before time t₄, and the clock PH_N+1 becomes the system clock CLK after time t₆.

FIG. 8B is a timing diagram of changing the system clock when the phase of the data signal leads to the phase of the system clock. When the phase of the data signal is detected by the phase detector 502 as leading the phase of the system clock, the phase down signal Sdn is enabled. Similarly, at time t₁, the flag signal Flag_N is disabled and the flag signal Flag_N−1 is enabled. The select signal Sel_N−1 is enabled at time t₂, and select signal Sel_N is disabled at time t₃. Therefore, the system clock CLK is changed to clock PH_N−1, thereby the system clock CLK is transferred.

FIG. 8C shows another timing diagram for changing the system clock when the phase of the data signal lags behind the phase of the system clock. FIG. 8C is in a situation that requires a fast response system. When the phase of the data signal DATA lags behind the phase of the system clock CLK, the phase down Sdn is enabled. The flag signal Flag_N is disabled and the flag signal Flag_N+1 is enabled at time t₂. When the flag signal is low, the low pass latch results in that the select signal will be the same level as the flag signal. Therefore, at time t₃, the select signal Sel_N+1 is enabled and the select signal Sel_N is disabled. After being processed by the output stage 508, the system clock CLK between time t₃ and t₄ is the result of the OR operation of the clocks PH_N and PH_N+1. At time t₄, the system clock CLK is changed to clock PH_N+1.

FIGS. 9A and 9B show a safety range for normally operating the phase change circuit to change the system clock of FIGS. 7A to 7F. FIG. 9A shows a safety range for normally operating the phase change circuit to change the system clock when the data lag behind the system clock. As shown in FIG. 9A, during the transition, the flag signal Flag_N must be changing between time t₁ and t₂ and flag signal Flag_N+1 must be changing between time t₁ and t₃ for avoiding malfunction. FIG. 9B shows a safety range for normally operating the phase change circuit to change the system clock when the data lead the system clock. As shown in FIG. 9B, during the transition, the flag signal Flag_N−1 must be changing between time t₁ and t₂ and flag signal Flag_N must be changing between time t₁ and t₃ for avoiding malfunction. The distances between t₂ and t₄, between t₃ and t₅ in FIG. 9A, and between t₃ and t₅ in FIG. 9B, are low pass latch delays.

FIGS. 10A to 10D show another logic circuit for changing the phase of the system clock. Comparing with FIGS. 7A–7D, the ring counter in FIG. 10A–10D is triggered at the falling edge and the select signals Sel_1~M are generated by M D-type flip-flops. The signal input of each of the D-type flip-flops is used for receiving the corresponding flag signal, the clock input of each D-type flip-flop is used for receiving 20 the corresponding clock, and the output end of the D-type flip-flop outputs the corresponding select signal. Taking the D-type flip-flop 1004 in FIG. 10C as an example, the flag signal Flag_N is inputted to the DN, the clock PH_N is inputted to the CKN and the QN outputs the select signal Sel_N. In addition, a reset signal is used to reset the flip-flop 1004. All the D-type flip-flop are triggered at falling edge.

Figure 11A:
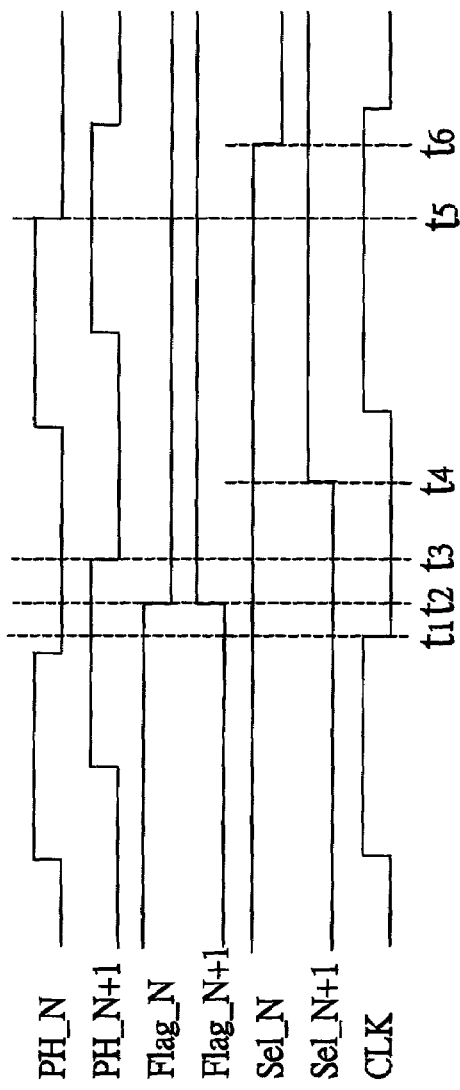
FIGS. 11A and 11B show timing diagrams of the changing system clock of FIGS. 10A to 10D.
Figure 11B:
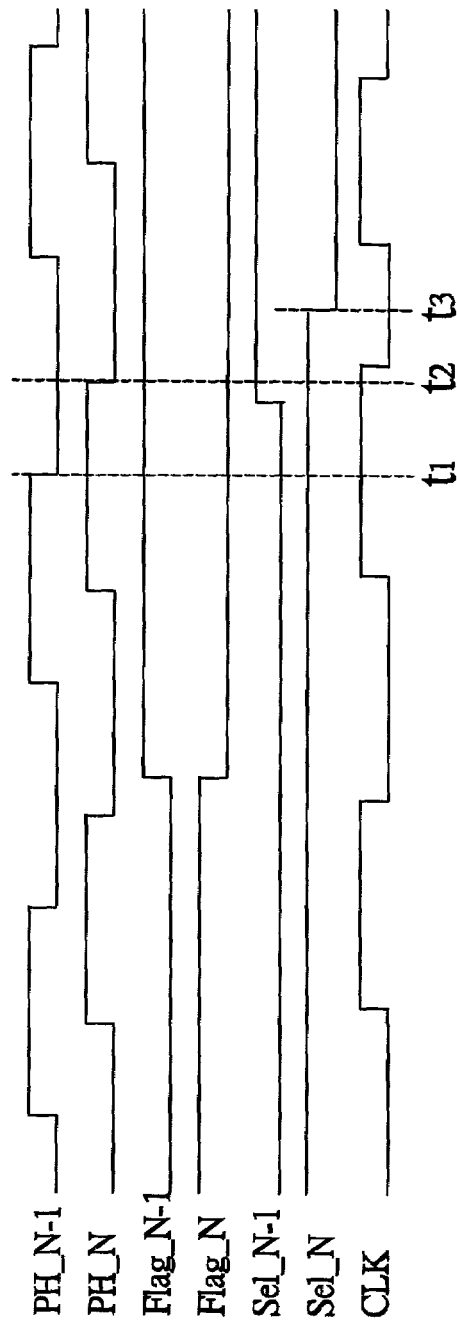

FIGS. 11A and 11B show timing diagrams of the phase-changing system clock of FIGS. 10A to 10D. FIG. 11A shows a timing diagram in which the phase of the data signal lags behind the phase of the system clock. At time t₁, the ring counter is triggered at the falling edge of the system clock CLK, and due to the signal delay, the flag signal Flag_N is disabled and the flag signal Flag_N+1 is enabled at time t₂.

At time t₃, the D-type flip-flop 1006 is triggered at falling edge of the clock PH_N+such that the select signal Sel_N+1 is enabled at time t₄. The D-type flip-flop 1004 is triggered at falling edge of the clock PH_N at time t₅ such that the select signal Sel_N is disabled at time t₆. Accordingly, one of the clocks PH_N and PH_N+1 is selected as the system clock CLK by performing an OR operation for the clocks PH_N and PH_N+1 between time t₄ and time t₆. The clock PH_N+1 is the system clock CLK after time t₆. FIG. 11B shows a timing diagram that the phase of the data signal leads the phase of the system clock. Similarly, at time t₁, the D-type flip-flop 1002 is triggered at the falling edge of the clock PH_N−1. At time t₂ the D-type flip-flop 1004 is triggered at falling edge of the clock PH_N such that the clock PH_N−1 serves as the system clock CLK after time t₃.

Figure 12A:
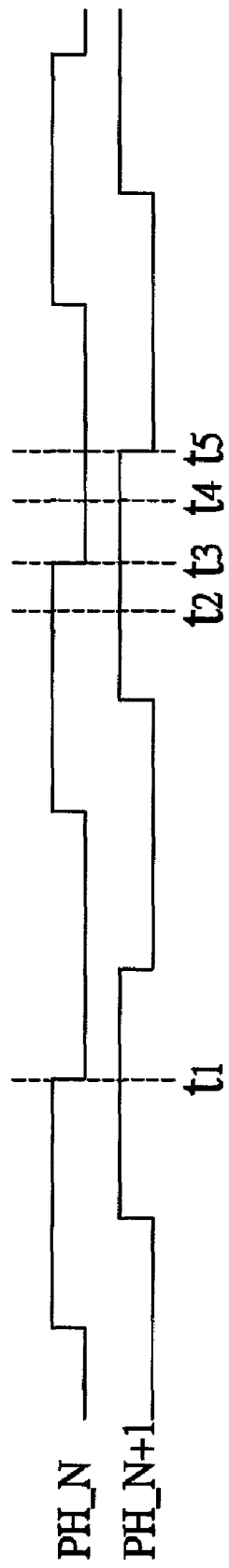
FIGS. 12A and 12B show a safety range for normally operating the phase change circuit to change the system clock of FIGS. 10A to 10D.
Figure 12B:
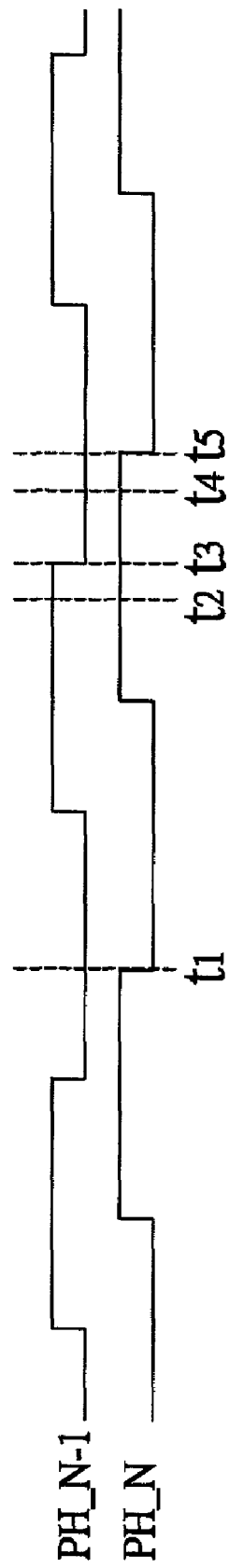

FIGS. 12A and 12B show a safety range for normally operating the phase change circuit to change the system clock of FIGS. 10A to 10D. FIG. 12A shows a safety range for the normal operation of the phase change circuit to change the system clock when the data lag behind the system clock. As shown in FIG. 12A, during the transition, the flag signal Flag_N should transfer between time t₁ and t₂. The D-type flip-flop requires a setup time from time t₂ to t₃. The flag signal Flag_N+1 should transfer between time t₁ and t₄ while the time period between t₄ and t₅ is the setup time of the D-type flip-flop. FIG. 12B shows a safety range for normally operating the phase change circuit to change the system clock when the data lead the system clock. As shown in FIG. 12B, the flag signal Flag_N−1 should transfer between time t₁ and t₂ and the flag signal Flag_N should transfer between time t₁ and t₄ to avoid malfunction. The time period between t₂ and t₃ and the time period between t₄ and t₅ are the setup time of the D-type flip-flop. In addition, the phase difference between the clocks PH_1~M should be less than half period of the clock for normal operation.

According to the present invention, the circuit for glitch-free changing of clocks having different phases uses logic circuits to eliminate the glitch during the transition of the clocks. No signal degradation is made on the clocks, therefore the method or circuit of this invention is suitable for a high frequency system and is immune from the nonlinear effects of circuits. Within the broad safety range provided by the invention, no glitch and data missing will occur. In addition, because logic circuits are used, there exists a larger tolerance about different manufacturing process, temperature, and power source etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A circuit for glitch-free changing of clocks having different phases, wherein the circuit receives M clocks labeled by 1~M and at least one data stream, in which the M clocks have the same frequency and are different in phase sequentially, and one of the M clocks (labeled by N, 1≦N≦M) is selected to be a system clock, the circuit comprising:

a phase detector for detecting the phases of the data stream and the system clock, and generating a phase-up signal and a phase-down signal accordingly;

a flag signal generator coupled to the phase detector for receiving the phase-up signal and the phase-down signal, and then generating M flag signals, wherein only one of the M flag signals is enabled at the same time;

a select signal generator coupled to the flag signal generator, for receiving the M flag signals and the M clocks to correspondingly generate M select signals;

means for enabling the select signal corresponding to the enabled flag signal; and an output stage coupled to the select signal generator, for receiving the M select signals and the M clocks, and then outputting the system clock, wherein the outputted system clock corresponds to one of the M clocks selected by the enabled select signal;

wherein when the phase of the data stream lags behind the phase of the system clock, the phase-up signal is enabled, then a flag signal N+1 corresponding to a clock N+1 is enabled, a select signal N+1 corresponding to the flag signal N+1 is enabled, and the clock N+1 is set as the system clock; and wherein when the phase of the data stream leads the phase of the system clock, the phase-down signal is enabled, then a flag signal N−1 corresponding to a clock N−1 is enabled, a select signal N−1 corresponding to the flag signal N−1 is enabled, and the clock N−1 is set as the system clock.

2. A circuit for glitch-free changing of clocks having different phases, wherein the circuit receives M clocks labeled by 1~M and at least one data stream, in which the M clocks have the same frequency and are different in phase sequentially, and one of the M clocks (labeled by N, $1 \leq N \leq M$) is selected to be a system clock, the circuit comprising:

a phase detector for receiving the data stream and the system clock, and generating a phase-up signal and a phase-down signal;

a flag signal generator coupled to the phase detector for receiving the phase-up signal and the phase-down signal, and then generating M flag signals, wherein only one of the M flag signal is enabled at the same time;

a select signal generator coupled to the flag signal generator, for receiving the M flag signals and the M clocks to correspondingly generate M select signals;

enabling the select signal corresponding to the enabled flag signal; and an output stage coupled to the select signal generator, for receiving the M select signals and the M clocks, and then outputting the system clock, wherein the outputted system clock corresponds to one of the M clocks selected by the enabled select signal;

wherein under the condition of clock N being at a first level, when the phase-up signal is enabled, the flag signal N+1 is enabled; and when the phase-down signal is enabled, the flag signal N−1 is enabled.

3. The circuit of claim 2 wherein the first level is a low level.

4. The circuit of claim 2 wherein a high level is defined as being enabled.

5. The circuit of claim 2 wherein the flag signal generator is a ring counter.

6. The circuit of claim 2 wherein the select signal generator comprises M low pass latches, and each of the M low pass latches comprises a clock input, a signal input, and an output.

7. The circuit of claim 6 wherein, for the Nth latch, its clock input correspondingly receives the clock N, the signal input correspondingly receives the flag signal N and the output correspondingly outputs the select signal N, and when the clock N is at a first level, the select signal N outputs the same level with the flag signal.

8. The circuit of claim 7 wherein the first level is a low level.

9. The circuit of claim 2 wherein the select signal generator comprises M D-type flip-flops, and each of the D-type flip-flops comprises a clock input, a signal input, and an output.

10. The circuit of claim 9 wherein each of the D-type flip-flops is triggered at a rising edge.

11. The circuit of claim 9 wherein, for each D-type flip-flop, its clock input correspondingly receives the clock N, the signal input correspondingly receives the flag signal N and the output correspondingly outputs the select signal N, and when the clock N is at a first level, the select signal N outputs the same level with the flag signal.

12. The circuit of claim 11 wherein the first level is a low level.

13. The circuit of claim 2 wherein the output stage further comprises:

M OR-gates, each of the OR-gate receiving each of the M select signals and each of the corresponding M clocks; and an AND-gate, for receiving outputs of the M OR-gates and outputting the system clock.

14. A method for changing clocks having different phase without glitch, used for receiving M clocks and at least one data stream and then outputting a system clock, wherein the M clocks have the same frequency but are different in phase sequentially, and one of the M clocks (labeled by clock N, $1 \leq N \leq M$) is currently the system clock, the method comprising the steps of:

a. determining the phase of the data stream, and proceeding to a next step b if the phase of the data stream is changed, otherwise repeating step a;

b. enabling a flag signal N+1 corresponding to the clock N+1 and then proceeding to a step c when the phase of the data stream lags behinds the phase of the system clock;

c. enabling a flag signal N−1 corresponding to the clock N−1 and then proceeding to a step d when the phase of the data stream leads the phase of the system clock and the system clock is at a first level;

d. enabling a select signal N+1 corresponding to the flag signal N+1 and then proceeding to a step f, when the clock N is at the first level;

e. enabling a select signal N−1 in response to the flag signal N−1 and then proceeding to a step g, when the clock N is at the first level;

f. setting the clock N+1 as the system clock and increasing N by one, and then returning to the step a; and g. setting the clock N−1 as the system clock and decreasing N by one, and then returning to the step a.

15. The method of claim 14 wherein a high level is defined as being enabled.

16. The method of claim 14 wherein the first level is a low level.

17. The circuit of claim 2 wherein when the phase of the data stream lags behind the phase of the system clock, the phase-up signal is enabled, and when the phase of the data stream leads the phase of the system clock, the phase-down signal is enabled.

* * * * *